W. ROTTER.
APPARATUS FOR MAKING PHONOGRAPH RECORDS.
APPLICATION FILED NOV. 19, 1910.
1,162,256.
Patented Nov. 30, 1915.
4 SHEETS—SHEET 1.
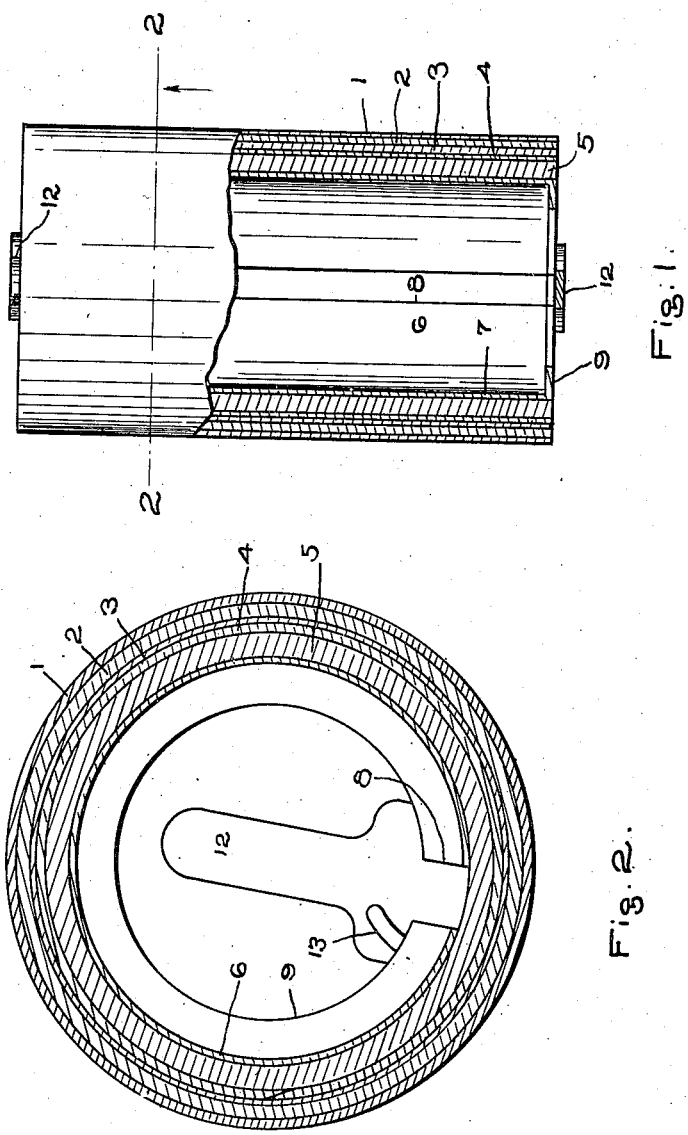

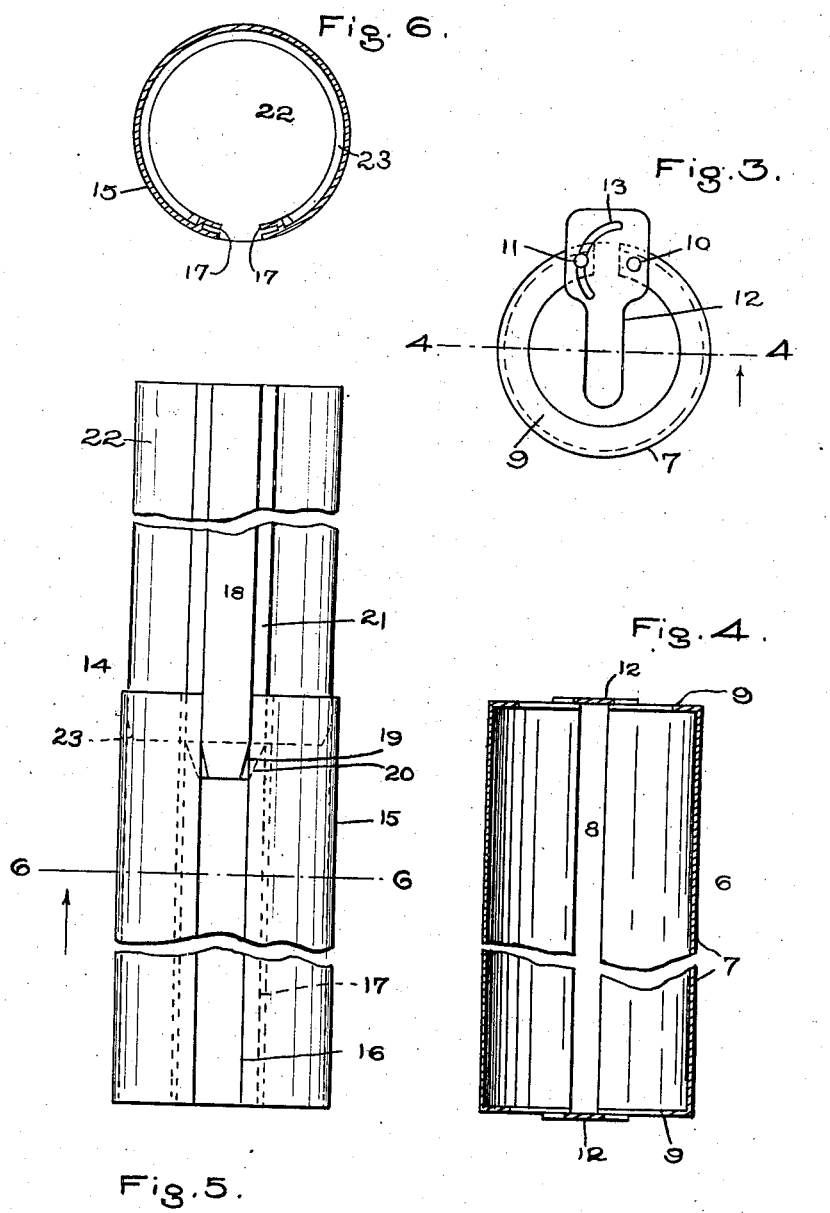

W. ROTTER.
APPARATUS FOR MAKING PHONOGRAPH RECORDS.
APPLICATION FILED NOV. 19, 1910.

1,162,256.

Patented Nov. 30, 1915.
4 SHEETS—SHEET 3.

WITNESSES
Cornelius Zabriskie
Frances E Blodgett

INVENTOR
William Rotter,
BY
Russell M. Everett,
ATTORNEY.

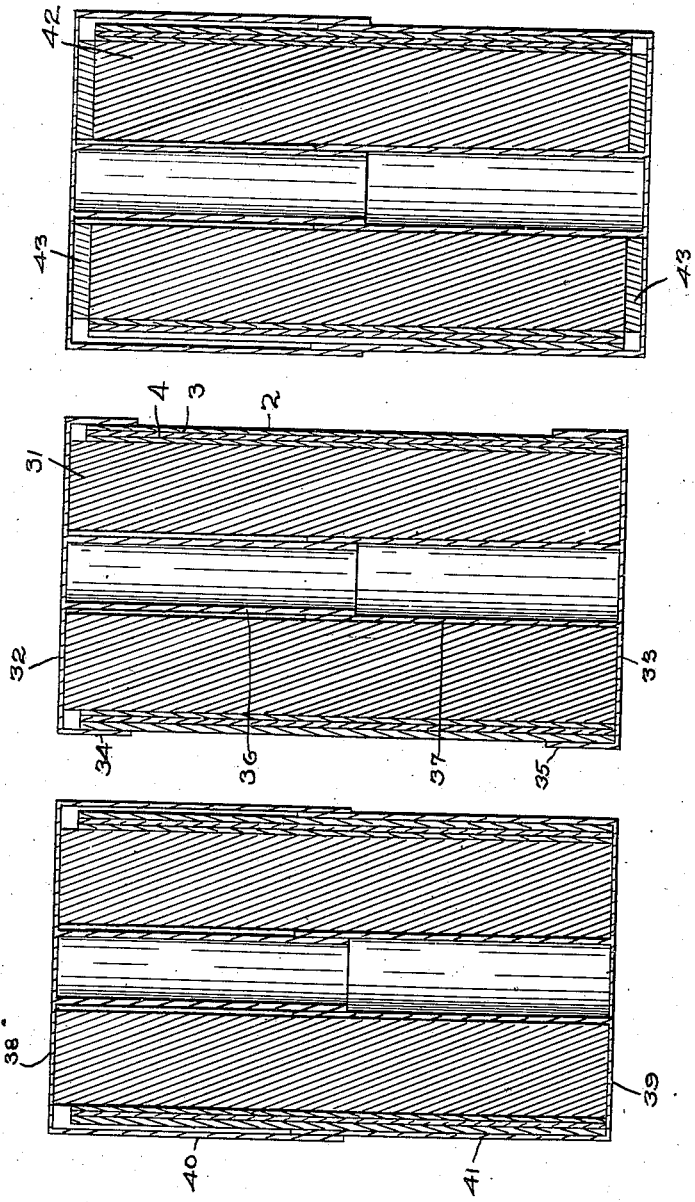

UNITED STATES PATENT OFFICE.

WILLIAM ROTTER, OF NEWARK, NEW JERSEY.

APPARATUS FOR MAKING PHONOGRAPH-RECORDS.

1,162,256.   Specification of Letters Patent.   Patented Nov. 30, 1915.

Application filed November 19, 1910. Serial No. 593,146.

*To all whom it may concern:*

Be it known that I, WILLIAM ROTTER, a citizen of the United States, residing at Newark, in the county of Essex and State of New Jersey, have invented certain Improvements in Apparatus for Making Phonograph-Records, of which the following is a specification.

The objects of this invention are to secure an improved method of manufacturing cylindrical records of plastic materials that can be softened by heat, such as celluloid and the like; to enable the requisite pressure of the cylinder against the matrix to be obtained directly and uniformly; to secure sharply defined impressions in the record and thus a clear and perfect sound reproduction; to reduce the cost and labor of manufacturing records, and to obtain other advantages and results as may be brought out in the following description.

Figure 7:
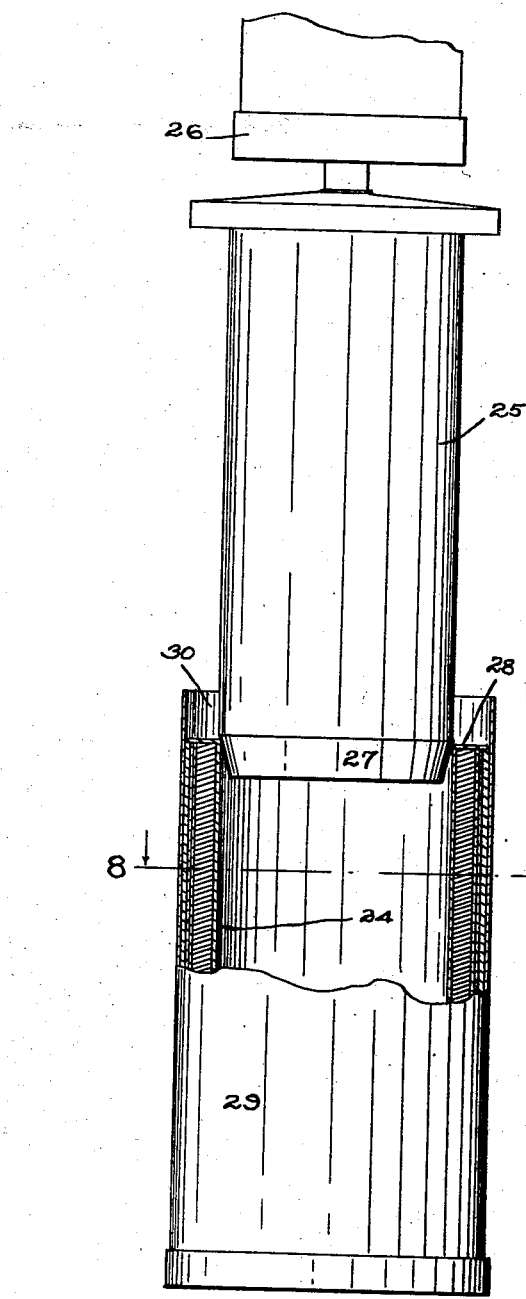
Figure 8:
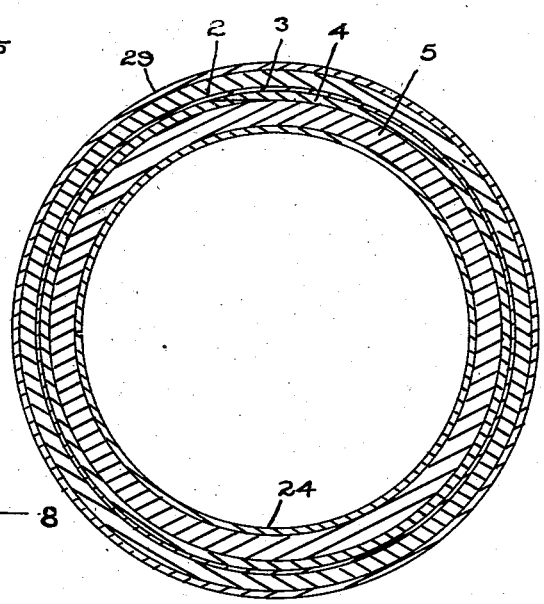

Referring to the accompanying drawings, in which like numerals of reference indicate the same parts throughout the several figures, Figure 1 is a side elevation of the preferred form of apparatus for carrying out my improved process, partly in central vertical section; Fig. 2 is a cross section on line 2—2 of Fig. 1, looking in the direction indicated by the arrow; Fig. 3 is an end view of the pressure producing means detached from the rest of the apparatus; Fig. 4 is a central longitudinal section of said pressure producing means, taken on line 4—4 of Fig. 3, looking in the direction indicated by the arrow; Fig. 5 is a side elevation of another form of pressure - producing means which can be employed in place of that shown in Figs. 1, 2, 3 and 4; Fig. 6 is a cross section on line 6—6 of Fig. 5, looking in the direction indicated by the arrow; Fig. 7 is a side elevation of an apparatus having modified means for producing the pressure; Fig. 8 is a cross-section on line 8—8 of Fig. 7, looking in the direction indicated by the arrow; Fig. 9 shows in central longitudinal section an apparatus having means for expanding the rubber sleeve radially by compressing it longitudinally, the compressing caps overlapping the ends of the matrix only a short distance; Fig. 10 illustrates a modification in which the end caps telescopically overlap each other at the outside of the matrix so as to form a casing, and Fig. 11 illustrates a form in which compressing rings are placed between the end caps and ends of the rubber sleeve.

In said drawings, and referring especially to Figs. 1, 2, 3 and 4, 1 indicates a cylindrical casing open at both ends and adapted to contain the cylindrical matrix 2 fitting is said casing so as to be supported thereby. The matrix 2 has on its inner surface the impressions to be produced on the record, and 3 indicates a cylinder of celluloid adapted to fit in said matrix and be pressed against the inner surface thereof. Inside the said celluloid cylinder 3 is a layer 4 of paper, and next inside said paper is a rubber sleeve 5. Inside said sleeve is an expander 6 by means of which the said rubber sleeve 5 is expanded radially outward in all directions to secure the requisite pressure of the celluloid cylinder against the matrix. The said expander 6 comprises a tubular sheet metal body portion 7 split longitudinally as at 8 and having inturned end flanges 9, 9. Upon each end of said tubular body portion 7 are means for forcing apart the edges of the same on opposite sides of its longitudinal slit 8, so as to obtain outward pressure. These means are the same for both ends of the device and comprise two studs 10, 11 set in the end flanges 9 on opposite sides of the slit 8, a hand lever 12 being pivoted upon one stud, as 10, and having in itself a slot 13 to receive the other stud 11. Said slot 13 is eccentric with respect to the pivotal stud 10, so that as the lever is swung in one direction it contracts the expander and when swung in the other direction expands it. In the drawings I have shown the handle of the lever 12 projecting radially inward over the end of the expander, but obviously it could extend in the opposite direction if desired. The two levers 12, 12 can be operated together and thus the tubular body portion 7 expanded to press the rubber sleeve 5 against the celluloid cylinder 3 to force it against the matrix. It will of course be understood that in connection with such pressure the matrix and celluloid cylinder are suitably heated to soften the latter.

In Figs. 5 and 6 of the drawings I have shown an expander 14 which can be used in place of the expander 6 just described, if desired. In this construction a tubular sheet metal body portion 15 is longitudinally slotted as at 16 and provided at the opposite edges of said slot with grooves 17, 17. After the body portion 15 has been inserted in a rubber sleeve, a wedge 18 is driven or forced into the longitudinal slot 16 of said tubular body portion, said wedge being tapered at one end for starting, as at 19, 20, and having suitable tongues 21 at its lateral longitudinal edges to enter the grooves 17, 17. Preferably there is attached to the said wedge a cylindrical filler 22 to occupy the inside of the tubular body portion 15, and positively retain the shape of the same. This filler 21 is somewhat shorter than the wedge 18, so as to give the latter time to expand the body portion before the filler reaches it, and furthermore said filler is tapered as at 23 to more readily enter the body portion. This wedge and filler are forced into the expander body portion by any suitable means, and when in place cause said body portion to expand uniformly to secure the desired pressure.

In Figs. 7 and 8 I have shown an expander consisting of a simple split tube 24 adapted to be placed inside the rubber sleeve, and a plunger 25 adapted to be forced into said split tube, as by a hydraulic press 26. Said plunger is tapered at its end 27 to start into the tube 24 and the outside diameter of said plunger is such as will secure the desired amount of expansion. Preferably the upper end of the expanding tube 24 has a flange 28 adapted to overlap the rubber sleeve 5, paper layer 4, celluloid cylinder 3, and matrix 2, so as to protect the upper ends of said parts. The lower ends of said parts, as well as the lower end of the expanding tube, rest upon the closed bottom of the casing 29, and the side walls of said casing preferably extend above said parts which the casing incloses, as at 30.

In Fig. 9 I have shown a thicker rubber sleeve 31 arranged inside of the paper layer 4, celluloid cylinder 3 and matrix 2, said sleeve 31 being somewhat longer than the said parts. Caps 32, 33 fit over the ends of said rubber sleeve, the flanges 34, 35 of said caps overlapping outside the matrix. Said caps furthermore have central tubular stems 36, 37 which are adapted to extend into the longitudinal chamber of the rubber sleeve 31 and telescope each other to guide the caps as they are pressed together.

Obviously when the caps 32, 33 are forced together the rubber sleeve 31 will be expanded to secure the desired outward pressure, and said caps may be forced together by any appropriate means whatever, such as a press.

In Fig. 10 end caps 38, 39 are provided having flanges 40, 41 which are long enough to overlap and telescope each other. Said flanges thus cover the sides of the matrix, and the end caps constitute a casing which incloses all the parts.

In Fig. 11 I have shown a modified form of apparatus in which the rubber sleeve 42 is of substantially the same length as the matrix and celluloid cylinder, washers 43, 43 being inserted between the ends of the rubber sleeve and the end caps. Said end caps therefore do not engage the rubber sleeve directly, but when forced together said rubber sleeve is expanded to produce the same radially outward pressure as is obtained by the constructions shown in Figs. 9 and 10.

It will be understood that any other substance which is sufficiently elastic to make it substantially equivalent to rubber can be employed for the sleeve which I have termed the "rubber sleeve", and I do not wish to be limited in such details except as the state of the art may require.

Having thus described the invention, what I claim is:

1. In an apparatus for making phonograph records, the combination with a tubular matrix adapted to receive within itself a hollow cylindrical record blank, of a sleeve of resilient material inside said matrix, a split tubular member inside said sleeve, and means arranged transversely of said split tubular member upon the ends thereof for expanding the split tubular member, said means being longitudinally of said split tubular member located outside the bore or passage thereof.

2. In an apparatus for making phonograph records, the combination with a tubular matrix adapted to receive within itself a hollow cylindrical record blank, of a sleeve of resilient material inside said matrix, a split tubular member inside said sleeve having end flanges bent radially inward, and means upon said end flanges outside the bore or passage of the tubular member for expanding the same.

3. In an apparatus for making phonograph records, the combination with a tubular matrix adapted to receive within itself a hollow cylindrical record blank, of a sleeve of resilient material inside said matrix, a split tubular member inside said sleeve, and levers one at each end of said split tubular member fulcrumed upon one of the margins thereof and engaging the margin upon the opposite side of the split to force said margins apart.

4. In an apparatus for making phonograph records, the combination with a tubular matrix adapted to receive within itself a hollow cylindrical record blank, of a sleeve of resilient material inside said matrix, a split tubular member inside said sleeve having end flanges bent radially inward, and levers on said end flanges outside the bore or passage of the tubular member for expanding the same.

5. In an apparatus for making phonograph records, the combination with a tubular matrix adapted to receive within itself a hollow cylindrical record blank, of a sleeve of resilient material inside said matrix, a split tubular member inside said sleeve, studs at each end of said split member at opposite sides of the split, and levers one pivoted on one stud of a pair and having an eccentric groove receiving the other stud.

WILLIAM ROTTER.

In the presence of—
   RUSSELL M. EVERETT,
   FRANCES E. BLODGETT.